(12) United States Patent
Sleet et al.

(10) Patent No.: US 11,040,421 B2
(45) Date of Patent: Jun. 22, 2021

(54) TORQUE TOOL WITH ELECTRIC MOTORS

(71) Applicant: FORUM US, INC., Houston, TX (US)

(72) Inventors: Peter Sleet, Collieston (GB); David Owen, Aberdeenshire (GB)

(73) Assignee: FORUM US, INC., Houston, TX (US)

(*) Notice: Subject to any disclaimer, the term of this patent is extended or adjusted under 35 U.S.C. 154(b) by 302 days.

(21) Appl. No.: 16/172,325

(22) Filed: Oct. 26, 2018

(65) Prior Publication Data
US 2020/0130112 A1 Apr. 30, 2020

(51) Int. Cl.
| | | |
|---|---|---|
| *B23P 19/06* | (2006.01) | |
| *B63C 11/52* | (2006.01) | |
| *B63G 8/00* | (2006.01) | |
| *G05D 1/00* | (2006.01) | |

(52) U.S. Cl.
CPC ............ *B23P 19/066* (2013.01); *B63C 11/52* (2013.01); *B63G 8/001* (2013.01); *G05D 1/0094* (2013.01); *B63G 2008/005* (2013.01); *G05D 1/0011* (2013.01)

(58) Field of Classification Search
CPC ... B25B 23/147; B25B 23/1475; B25B 23/14; B25B 21/00; B25B 23/141; B25B 21/008; B25B 23/1415; B23P 19/066; B23P 19/06; B63C 11/52; B63G 8/001; B63G 2008/005; E21B 41/0007; E21B 41/0014; E21B 41/04; E21B 41/06; G05D 1/0094; G05D 1/0011
See application file for complete search history.

(56) References Cited

U.S. PATENT DOCUMENTS

| | | | |
|---|---|---|---|
| 3,454,111 A | * | 7/1969 | Niess .................. B25B 23/1456 173/176 |
| 4,411,317 A | | 10/1983 | Gieswein |
| 4,443,130 A | | 4/1984 | Hall |
| 5,253,554 A | | 10/1993 | Riera et al. |
| 6,167,831 B1 | | 1/2001 | Watt et al. |

(Continued)

FOREIGN PATENT DOCUMENTS

| | | |
|---|---|---|
| EP | 3107690 A2 | 12/2016 |
| GB | 2557200 A | 6/2018 |

(Continued)

OTHER PUBLICATIONS

International Invitation to Pay Fees dated Jan. 21, 2020, corresponding to Application No. PCT/US2019/054397.

(Continued)

*Primary Examiner* — Robert J Scruggs
(74) *Attorney, Agent, or Firm* — Patterson + Sheridan, LLP

(57) ABSTRACT

A torque tool for use subsea with a remotely operated vehicle (ROV) includes a tool housing, a socket drive configured to rotate within the tool housing, and a drive mechanism configured to provide torque to rotate the socket drive within the tool housing. The drive mechanism includes a first torque electric drive motor configured to provide a first torque to the socket drive, and a second torque electric drive motor configured to provide a second torque to the socket drive different from the first torque. The first torque electric drive motor and the second torque electric drive motor are configured to together provide a third torque that is higher than the first torque and the second torque.

19 Claims, 6 Drawing Sheets

(56) References Cited

U.S. PATENT DOCUMENTS

| | | | |
|---|---|---|---|
| 6,223,675 B1 | 5/2001 | Watt et al. | |
| 6,257,162 B1 | 7/2001 | Watt et al. | |
| 6,390,012 B1 | 5/2002 | Watt et al. | |
| 6,805,382 B2 | 10/2004 | Jennings | |
| 6,928,947 B1 | 8/2005 | Clapham | |
| 10,107,059 B2 | 10/2018 | Thompson et al. | |
| 2008/0000333 A1* | 1/2008 | Seno | B23P 19/06 81/467 |
| 2008/0250570 A1* | 10/2008 | Dayton | E04D 13/0765 7/170 |
| 2012/0175123 A1 | 7/2012 | Roberts et al. | |
| 2013/0167691 A1 | 7/2013 | Ullrich et al. | |
| 2015/0306747 A1* | 10/2015 | Theureaux | B25B 13/06 81/57.13 |
| 2016/0121467 A1* | 5/2016 | Ng | B25B 21/026 173/176 |
| 2016/0346883 A1* | 12/2016 | Walton | B23P 19/069 |
| 2016/0346910 A1* | 12/2016 | Walton | B25B 21/00 |
| 2017/0114612 A1* | 4/2017 | Lewkoski | B25B 21/002 |

FOREIGN PATENT DOCUMENTS

| | | |
|---|---|---|
| JP | H10329051 A | 12/1998 |
| WO | 2004065068 A1 | 8/2004 |
| WO | 2015118335 A2 | 8/2015 |
| WO | 2017042152 A1 | 3/2017 |

OTHER PUBLICATIONS

International Search Report and Written Opinion dated Jan. 21, 2020, corresponding to Application No. PCT/US2019/054413.
Non-Final Office Action dated Sep. 30, 2020 for U.S. Appl. No. 16/172,360.
International Search Report dated Mar. 16, 2020 for Application No. PCT/US2019/054397.

* cited by examiner

TORQUE TOOL WITH ELECTRIC MOTORS

BACKGROUND

Field

Embodiments of the present disclosure relate to a torque tool that includes electric motors to apply torque to a subsea component used in the oil and gas industry.

Description of the Related Art

Subsea torque tools are required to perform a range of tasks on subsea infrastructure and equipment, such as to apply torque to actuate rotating components of valves, or to lockdown or release clamps on equipment for the oil and gas industry. Typically, these rotating components are designed to be actuated at a specific torque, and when required to rotate a subsea component, an operator of a remotely operated vehicle (ROV) torque tool will choose the correct socket size and apply the appropriate torque so that the tool does not impart a torque greater than the maximum capability of the subsea component. The component may fail or become damaged if the torque applied thereto by a torque tool is excessive. The retrieval of the subsea component for repair or replacement can be difficult and expensive.

The range of tasks that an ROV torque tool is required to perform necessitates that the torque output of the tool must be changed depending on the torque requirements of the task. The changing of a torque output of the tool has previously been achieved by returning the ROV torque tool to the surface to change out a gearbox and/or change the drive motor of the tool.

Therefore, there exists a need for a torque tool configured to reliably provide a range of torques that are measurable and consistent.

SUMMARY

Embodiments disclosed herein relate to tools and methods for applying torque to subsea components utilized in the oil and gas industry.

In one embodiment, a torque tool for use subsea with a remotely operated vehicle (ROV) is disclosed. The torque tool includes a tool housing, a socket drive configured to rotate within the tool housing, and a drive mechanism configured to provide torque to rotate the socket drive within the tool housing. The drive mechanism includes a first torque electric drive motor configured to provide a first torque to the socket drive, and a second torque electric drive motor configured to provide a second torque to the socket drive different from the first torque.

In another embodiment, a method of applying torque to a subsea component is disclosed. The method includes latching a torque tool to the subsea component, receiving electric power at the torque tool, receiving a control signal at the torque tool, providing torque to the subsea component from the torque tool using the electric power based upon the control signal, and unlatching the torque tool from the subsea component.

In yet another embodiment, a torque tool configured to apply torque to a subsea component with a remotely operated vehicle (ROV) is disclosed. The torque tool includes a tool housing, a socket drive configured to rotate within the tool housing, a latch mechanism configured to move between an engaged position to engage the subsea component and a disengaged position to disengage the subsea component, and a drive mechanism configured to provide torque to rotate the socket drive within the tool housing. The drive mechanism includes a first torque electric drive motor configured to provide a first torque to the socket drive, and a second torque electric drive motor configured to provide a second torque to the socket drive different from the first torque, in which the first torque electric drive motor and the second torque electric drive motor are configured to together provide a third torque to the socket drive that is higher than the first torque and the second torque.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized with other embodiments without specific recitation.

DETAILED DESCRIPTION

Embodiments of the present disclosure relate to a torque tool for use subsea with an ROV to provide torque to a subsea component. The tool includes a tool housing and a socket drive that rotates within the tool housing. The socket drive is used to engage and provide torque to the subsea component. The tool further includes a drive mechanism to provide torque to rotate the socket drive within the tool housing. The drive mechanism includes a first torque electric drive motor to provide a first torque to the socket drive and a second torque electric drive motor to provide a second torque to the socket drive that is different from the first torque. The first torque electric drive motor and the second torque electric drive motor are able to provide torque independently to the socket drive, such as at the first torque or the second torque, or are able to provide torque together to the socket drive, such as at a third torque higher than the first torque and the second torque. The torque tool is able to receive electric power, such as from the ROV or from the surface, and provide the electric power to the first torque electric drive motor and the second torque electric drive motor. The torque tool is able to receive control signals, such as also from the ROV or from the surface, to control the first torque electric drive motor and the second torque electric drive motor.

Figure 1:
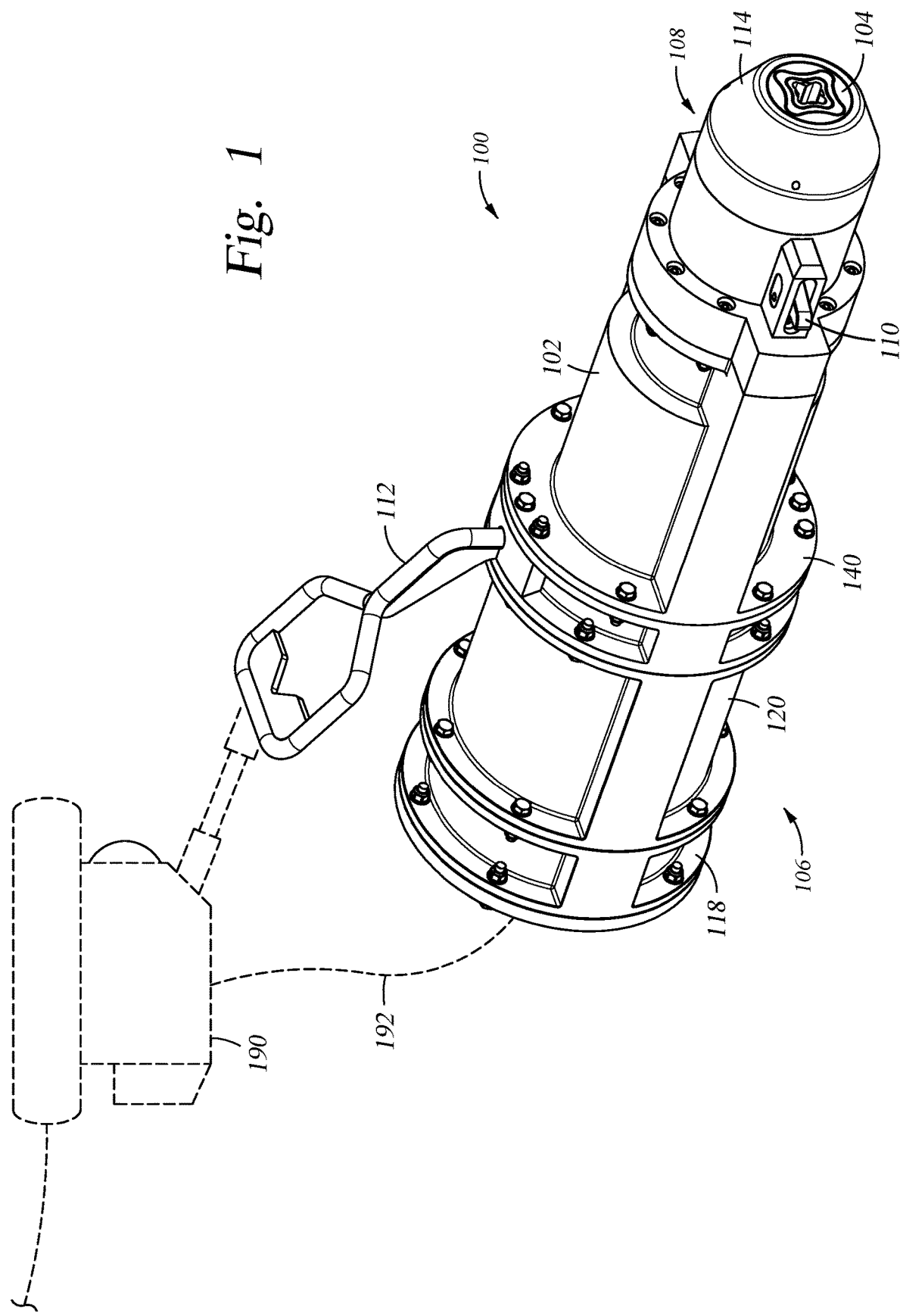
FIG. 1 is a perspective view of a torque tool in accordance with one or more embodiments of the present disclosure.
Figure 2:
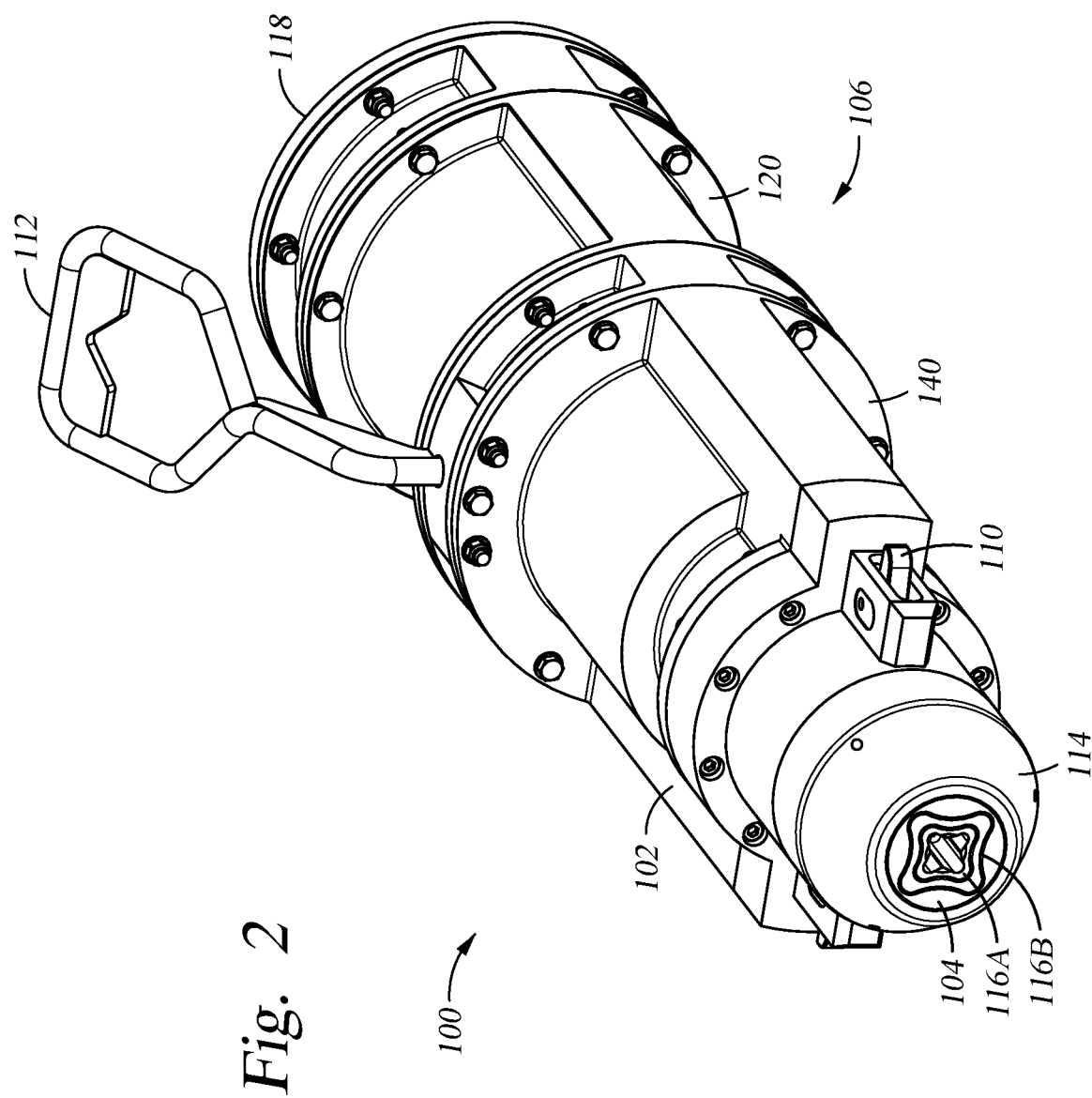
FIG. 2 is a perspective view of the torque tool in accordance with one or more embodiments of the present disclosure.
Figure 3:
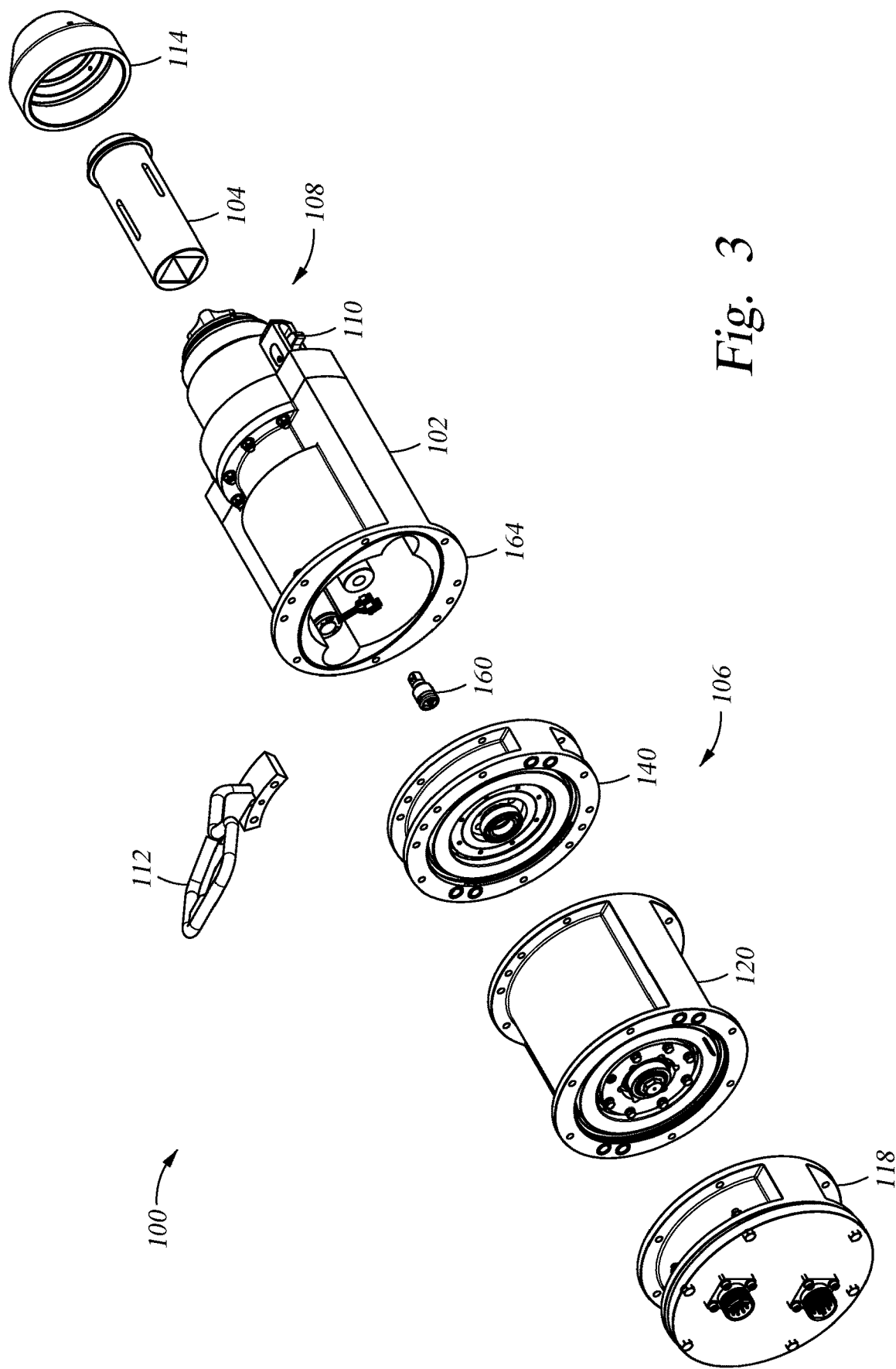
FIG. 3 is an exploded view of the torque tool in accordance with one or more embodiments of the present disclosure.

FIGS. 1-3 provide multiple views of a torque tool 100 in accordance with one or more embodiments of the present disclosure. In particular, FIGS. 1 and 2 are perspective views of the torque tool 100, and FIG. 3 is an exploded view of the torque tool 100. The tool 100 is for use subsea with an ROV 190 to provide torque to a subsea component. The tool 100 includes a housing 102 with a socket drive 104 positioned within and rotatable with respect to the housing 102. The tool 100 further includes a drive mechanism 106 to provide torque to the socket drive 104, such as for rotating the socket drive 104. The socket drive 104 is used to provide torque to the subsea component with the drive mechanism 106 generating and providing the torque used by the socket drive 104. The drive mechanism 106 includes multiple electric motors to provide torque to the socket drive 104. Further, the housing 102 of the tool 100 is formed from one or more components (e.g., sub-housings) coupled with each other. Thus, though the tool 100 is shown as having multiple components used to form the housing 102, discussed more below, the tool 100 is not so limited and may have more or less components used to form the housing 102 without departing from the scope of the present disclosure.

The tool 100 includes a latch mechanism 108 with one or more latches 110 movable between an engaged position and a disengaged position. The latch mechanism 108 is used to engage and latch the tool 100 to the subsea component when providing torque to the subsea component through the socket drive 104. The latch mechanism 108 secures the tool 100 to the subsea component to prevent the tool 100 from axially moving with respect to the subsea component, therefore enabling the tool 100 to maintain engagement with the subsea component and provide torque through the socket drive 104. The tool 100 further includes a handle 112 coupled to the housing 102 for the ROV 190 to grip and move the tool 100 through the use of the handle 112.

A nose cone 114 is included within the tool 100, such as coupled to the housing 102, with the socket drive 104 rotatable with respect to the nose cone 114. The nose cone 114 may be used to help guide the tool 100, or the socket drive 104, into engagement with the subsea component. Further, the socket drive 104 may include one or more sockets 116A and 116B of different sizes to engage with different sized subsea components. The sockets 116A and 116B may be nested and movable with respect to each other, such as by having a smaller socket 116A positioned within and movable with respect to a larger socket 116B. For example, when engaging a subsea component with the larger socket 116B, the smaller socket 116A moves with respect to the larger socket 116 by retracting into the tool 100 to receive the subsea component into the larger socket 116B.

As mentioned above, the drive mechanism 106 includes multiple electric motors to provide torque to the socket drive 104. Accordingly, the drive mechanism 106 as shown includes a first torque electric drive motor 120 and a second torque electric drive motor 140. The first torque electric drive motor 120 is used to provide a first torque to the socket drive 104, such as to rotate the socket drive 104 in the tool 100 at the first torque. The second torque electric drive motor 140 is used to provide a second torque to the socket drive 104 that is different from the first torque. In particular, the first torque electric drive motor 120 may be a high torque electric drive motor to provide a high torque to the socket drive 104, and the second torque electric drive motor 140 may be a low torque electric drive motor to provide a low torque (e.g., relative to the high torque of the high torque electric drive motor) to the socket drive 104. However, in one or more embodiments, the first torque electric drive motor 120 may be a low torque electric drive motor and the second torque electric drive motor 140 may be a high torque electric drive motor without departing from the scope of the present disclosure. The torque tool 100 further includes a drive extension 160 and a gearbox 164 configured to translate or provide torque from the drive mechanism 106 to the socket drive 104.

The first torque electric drive motor 120 and the second torque electric drive motor 140 are able to provide torque independently (e.g., individually) to the socket drive 104, such as independently at the low torque or the high torque. An example range for the low torque may be from about 0 N•m to about 450 N•m, and an example range for the high torque may be from about 450 N•m to about 2,725 N•m. Further, the first torque electric drive motor 120 and the second torque electric drive motor 140 are able to provide torque together to the socket drive 104 at a third torque that is higher than the low torque or the high torque. An example range for the combined third torque may be from about 2,725 N•m to about 3,195 N•m.

The torque tool 100 further includes an electronics section 118 to receive electric power for the tool 100. The electronics section 118 may receive electric power from the ROV 190, as shown, and/or from the surface, such as from a support structure (e.g., vessel or rig) located on or above a surface of the sea. The electric power may be provided to the electronics section 118 using a cable 192, umbilical, tether, or similar structure capable of transmitting electric power. The electric power is provided from the electronics section 118 then to the first torque electric drive motor 120 and the second torque electric drive motor 140 as needed. Additionally or alternatively, the electronics section 118 may include a power source, such as a battery, to store and provide electric power. Further, in one or more embodiments, the electronics section 118 may include a power generator to generate electric power. Electric power is provided from the electronics section 118 to the second torque electric drive motor 140 through the first torque electric drive motor 120. For example, as the first torque electric drive motor 120 and the second torque electric drive motor 140 are arranged co-axially within the tool 100, electric power from the electronics section 118 is routed to the first torque electric drive motor 120 and then to the second torque electric drive motor 140.

The electronics section 118 may additionally or alternatively be used to receive control signals for the tool 100. For example, the electronics section 118 may receive control signals for controlling the first torque electric drive motor 120 and the second torque electric drive motor 140 as needed. In such an embodiment, the electronics section 118 may include a controller that receives the control signals from the ROV and/or the surface. The control signals may be sent to the electronics section 118 using the same medium as the electric power (e.g., the cable 192), or the control signals may be separately sent to the electronics section 118, such as through a separate cable or wirelessly.

Figure 4:
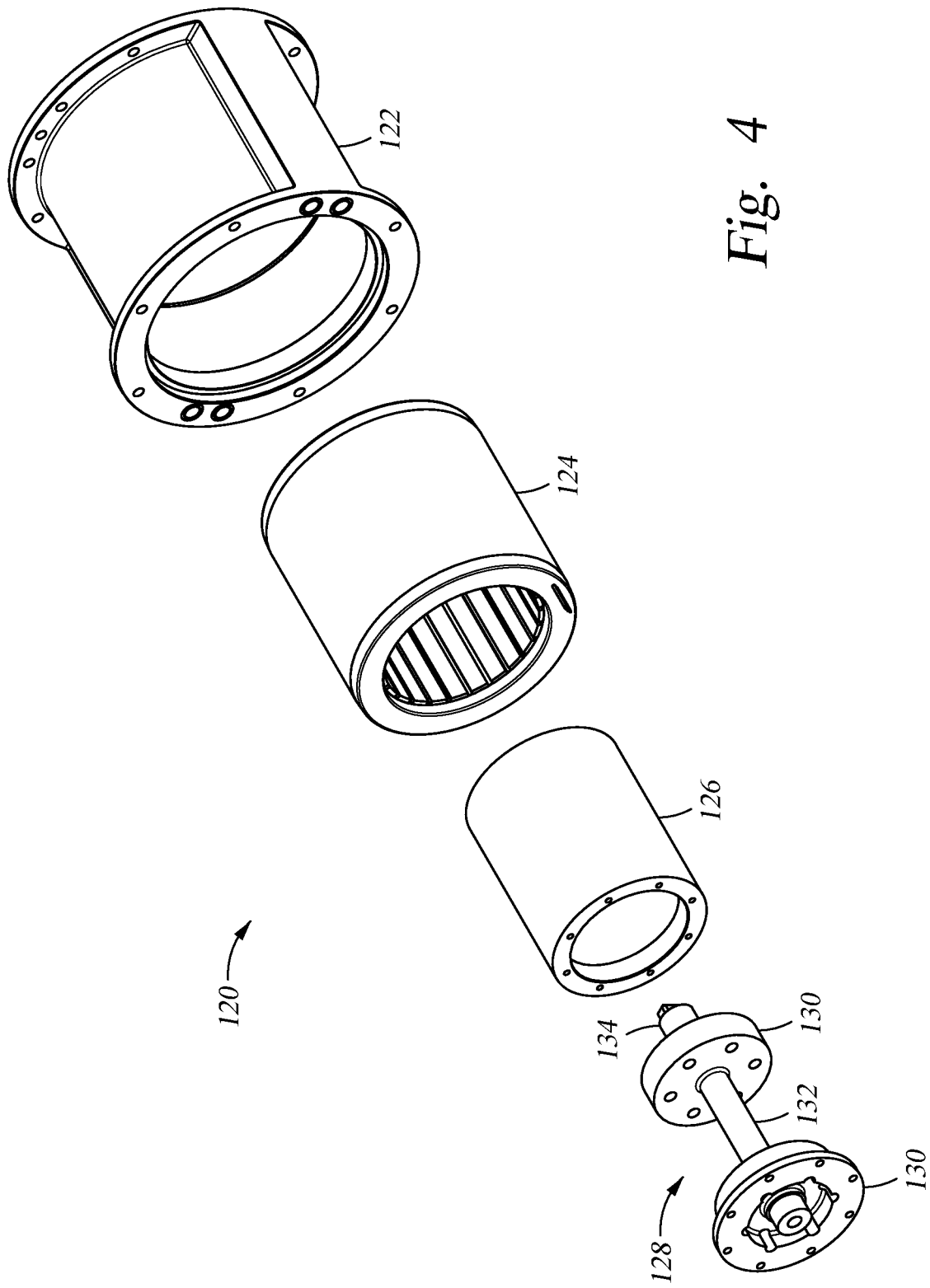
FIG. 4 is an exploded view of a first torque electric drive motor in accordance with one or more embodiments of the present disclosure.
Figure 5:
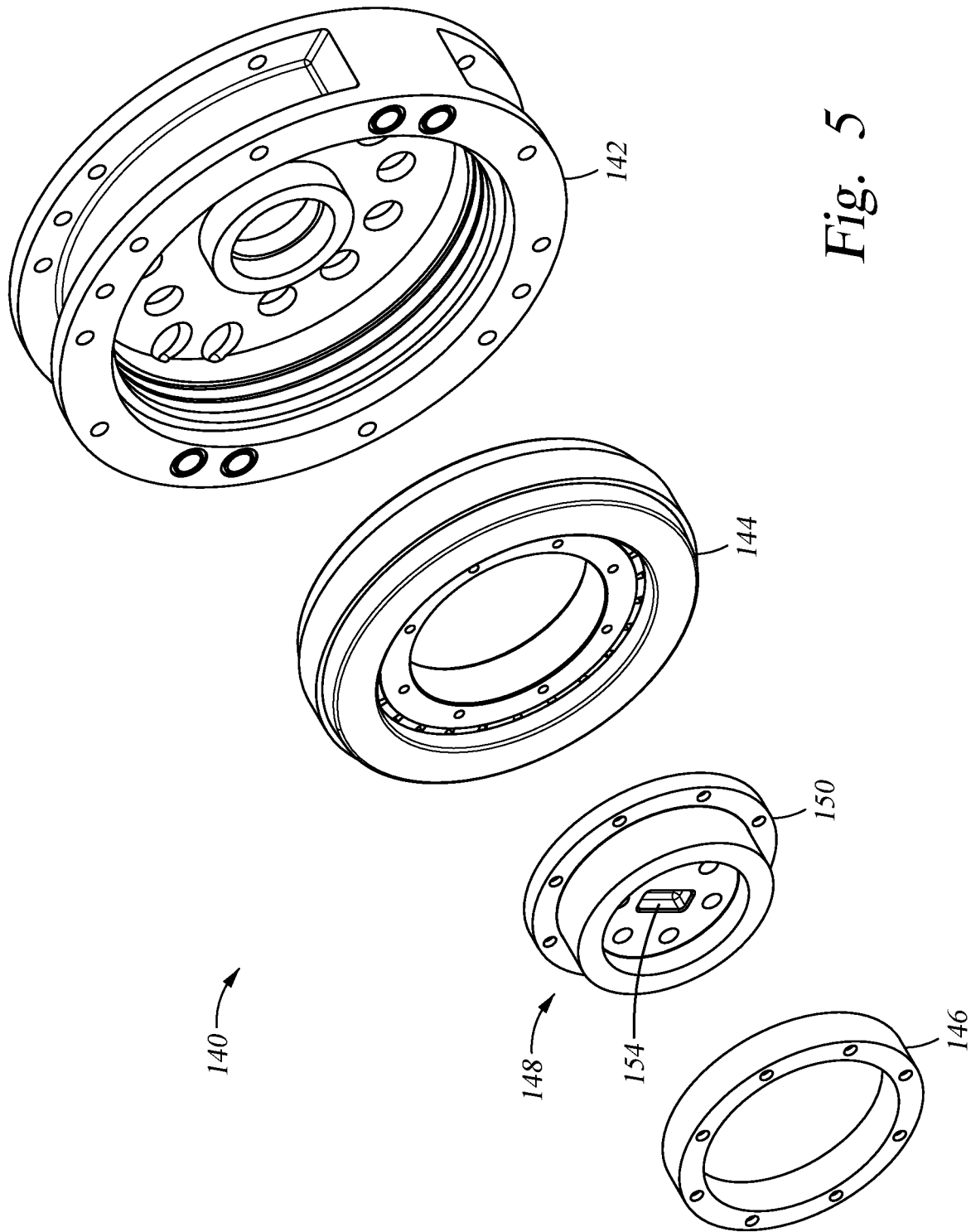
FIG. 5 is an exploded view of a second torque electric drive motor in accordance with one or more embodiments of the present disclosure.

FIGS. 4 and 5 provide multiple views of the first torque electric drive motor 120 and the second torque electric drive motor 140 in accordance with one or more embodiments of the present disclosure. In particular, FIG. 4 is an exploded view of the first torque electric drive motor 120, and FIG. 5 is an exploded view of the second torque electric drive motor 140. In one or more embodiments, the first torque electric drive motor 120 and/or the second torque electric drive motor 140 is a direct drive motor, and more particularly a frameless direct drive motor. Thus, the first torque electric drive motor 120 and/or the second torque electric drive motor 140 include a stator and a rotor with the stator used to provide torque to and rotate the stator.

The first torque electric drive motor 120, as shown in FIG. 4, includes a first torque electric drive motor housing 122.

Positioned within the housing 122 is a first torque electric drive motor stator 124 and a first torque electric drive motor rotor 126. The first torque electric drive motor rotor 126 is positioned within and rotatable with respect to the first torque electric drive motor stator 124. For example, the first torque electric drive motor stator 124 includes one or more windings or coils, and the first torque electric drive motor rotor 126 includes one or more magnets. As electric power (e.g., current in this embodiment) is provided to the windings of the stator 124, the windings generate magnetic fields that interact with the magnets of the rotor 126 to provide torque to and rotate the rotor 126 with respect to the stator 124.

Further, the first torque electric drive motor 120 includes a first torque drive member 128. The first torque drive member 128 is coupled to the rotor 126 to rotate with the rotor 126 and provide torque from the rotor 126 through the member 128. The first torque drive member 128, in this embodiment, includes one or more plates 130 that are coupled to the rotor 126 with a shaft 132 coupled to the plates 130. An engagement member, referred to herein as a key 134, is positioned or formed at the end of the shaft 132 configured to translate or provide torque from the first torque drive member 128 to the socket drive 104. The first torque drive member 128 couples with the socket drive 104, such as indirectly through one or more components (e.g., the second torque electric drive motor 140, a gearbox, a driveshaft, and/or one or more other components discussed more below), to provide the first torque from the first torque electric drive motor 120 to the socket drive 104.

The second torque electric drive motor 140, as shown in FIG. 5, includes a second torque electric drive motor housing 142. Positioned within the housing 142 is a second torque electric drive motor stator 144 and a second torque electric drive motor rotor 146. The second torque electric drive motor rotor 146 is positioned within and rotatable with respect to the second torque electric drive motor stator 144. For example, the second torque electric drive motor stator 144 includes one or more windings or coils, and the second torque electric drive motor rotor 146 includes one or more magnets. The second torque electric drive motor 140 further includes a second torque drive member 148. The second torque drive member 148 is coupled to the rotor 146 to rotate with the rotor 146 and provide torque from the rotor 146 through the member 148. The second torque drive member 148, in this embodiment, includes a plate 150 that is coupled to the rotor 146. The plate 150 includes a groove 154 configured to receive the key 134 of the first torque drive member 128 to translate or provide torque to the socket drive 104. As with the first torque drive member 128, the second torque drive member 148 couples with the socket drive 104, such as indirectly through one or more components, to provide the second torque from the second torque electric drive motor 140 to the socket drive 104.

In one or more embodiments, other arrangements may be provided for the first torque electric drive motor and the second torque electric drive motor than those shown or described above without departing from the scope of the present disclosure. For example, the windings included within the stator of the first or second torque electric drive motor may instead be included within the rotor, and the magnets included within the rotor may then be included within the stator. Further, though the first torque electric drive motor and the second torque electric drive motor are described above as direct drive motors, the present disclosure is not so limited, as the first torque electric drive motor and/or the second torque electric drive motor may be any electric motor known in the art that converts electric power or energy into mechanical power or energy for providing torque.

Figure 6:
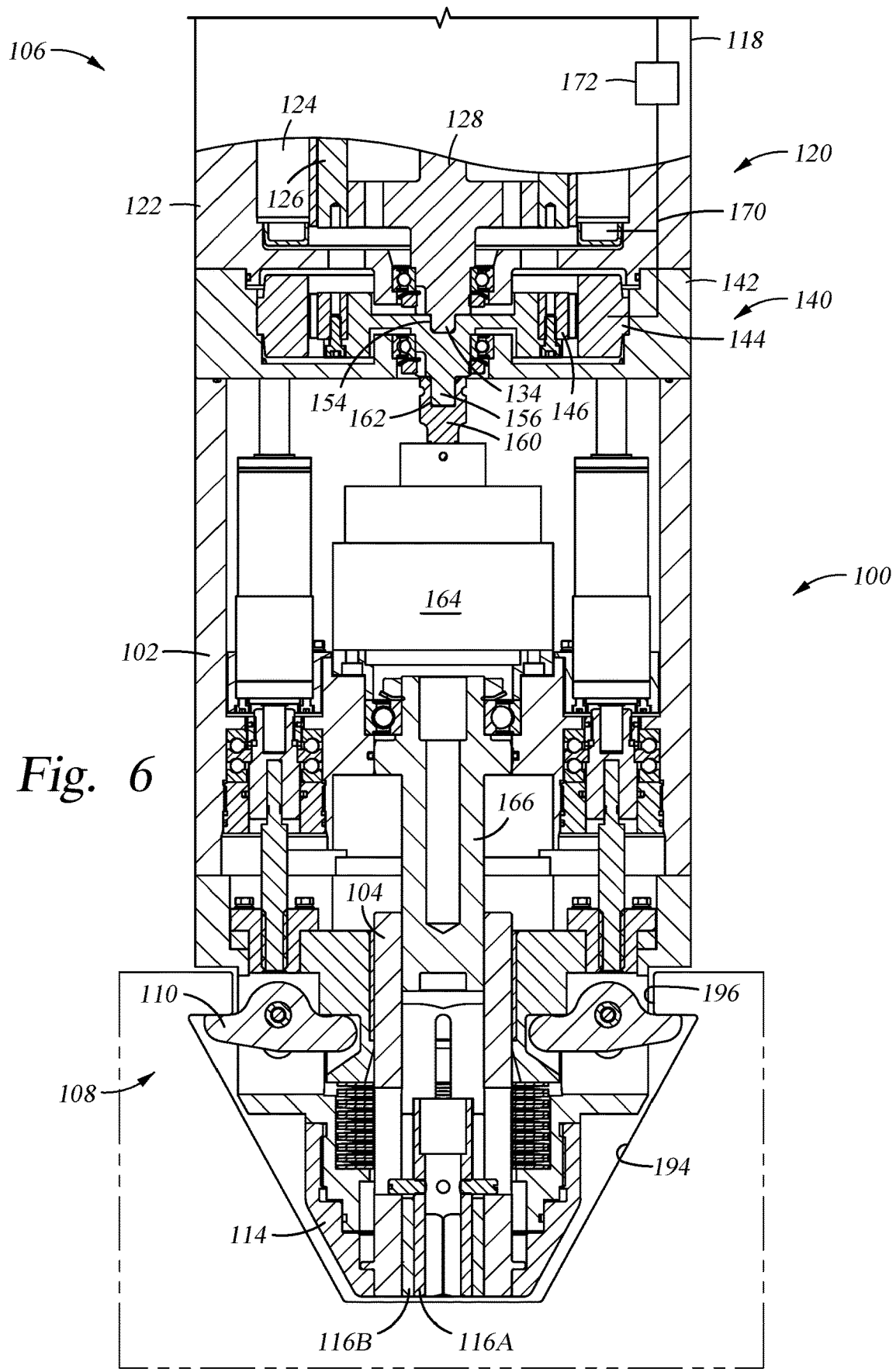
FIG. 6 is a cross-sectional view of an end of the torque tool in accordance with one or more embodiments of the present disclosure.

FIG. 6 provides a cross-sectional view of an end of the torque tool 100 in accordance with one or more embodiments of the present disclosure. In particular, FIG. 6 shows the torque tool 100 received within a subsea component 194. The latches 110 of the latch mechanism 108 are engaged with a shoulder 196 of the subsea component 194 to latch the tool 100 to the subsea component 194. As discussed above, the first torque electric drive motor 120 and the second torque electric drive motor 140 are arranged co-axially within the tool 100. Electric power from the electronics section 118 is routed to the first torque electric drive motor 120 and then to the second torque electric drive motor 140. For example, as shown, an electric conduit 170 may extend from a controller 172 of the electronics section 118 to the first torque electric drive motor stator 124 to provide electric power from the electronics section 118 to the first torque electric drive motor 120. The electric conduit 170 may continue to extend from the first torque electric drive motor 120 to the second torque electric drive motor stator 144 to provide electric power to the second torque electric drive motor 140. Thus, electric power is provided from the electronics section 118, to the first torque electric drive motor 120, and then to the second torque electric drive motor 140. The controller 172 may be used for providing power to and controlling the first torque electric drive motor 120 and the second torque electric drive motor 140. The electric conduit 170 may include or be formed from one or more components, such as a wire or cable, capable of transmitting electric power.

Torque from the first torque electric drive motor 120 is provided to the socket drive 104 through the second torque electric drive motor 140, in addition to one or more additional components. As shown in FIG. 6, the first torque drive member 128 of the first torque electric drive motor 120 is coupled to, such as directly engaged with, the second torque drive member 148 of the second torque electric drive motor 140. In particular, the first torque drive member 128 and the second torque drive member 148 are coupled to each other in this embodiment through a male and female coupling or engagement, such as with the key 134 positioned or formed on the first torque drive member 128 that couples or engages with the groove 154 positioned or formed within the second torque drive member 148. This arrangement enables torque to be provided to the socket drive 104 from the first torque drive member 128 (or the first torque electric drive motor 120) and through the second torque drive member 148 (or the second torque electric drive motor 140).

Further, one or more components are positioned or coupled between the drive mechanism 106 and the socket drive 104 to provide torque from the drive mechanism 106 to the socket drive 104. As shown in FIG. 6, the drive extension 160, the gearbox 164, and a drive shaft 166 are coupled between the drive mechanism 106 to the socket drive 104 to translate or provide torque from the drive mechanism 106 to the socket drive 104. In this embodiment, the drive mechanism 106, and more particularly the second torque drive member 148, is coupled to, such as directly engaged with, the drive extension 160. The second torque drive member 148 is coupled to the drive extension 160 through a male and female coupling or engagement, such as with a key 156 positioned or formed on the second torque drive member 148 that couples or engages with a groove 162 positioned or formed within the drive extension 160.

The drive extension 160 is coupled to the gearbox 164 to provide torque from the drive mechanism 106 through the drive extension 160 and to the gearbox 164. The gearbox 164 may be used to provide speed and torque conversions from the drive mechanism 106 to the socket drive 104. For example, in one embodiment, the gearbox 164 includes a step down gearbox with a fixed ratio. Further, the gearbox 164 is coupled to the drive shaft 166, which in turn is coupled to or engaged with the socket drive 104. The drive extension 160, the gearbox 164, the drive shaft 166, and/or additional components are, thus, used to provide torque from the drive mechanism 106 to the socket drive 104.

In operation, when the first torque electric drive motor 120 is rotating and/or providing torque to the socket drive 104, the second torque electric drive motor 140 is also rotating with the first torque electric drive motor 120. For example, even though the second torque electric drive motor 140 may not be powered to provide torque to the socket drive 104, the second torque electric drive motor 140 (e.g., the second torque drive member 148) will rotate with the first torque electric drive motor 120 (e.g., the first torque drive member 128) for the first torque electric drive motor 120 to provide torque to the socket drive 104. In such an embodiment, the second torque electric drive motor 140 will not apply an electrical load (e.g., a counter-torque) against the first torque electric drive motor 120. Thus, other than frictional loads or forces, the second torque electric drive motor 140 will freely spin with the first torque electric drive motor 120 for torque from the first torque electric drive motor 120 to be provided to the socket drive 104 through the second torque electric drive motor 140.

Similarly, when the second torque electric drive motor 140 is rotating and/or providing torque to the socket drive 104, the first torque electric drive motor 120 is rotating with the second torque electric drive motor 140. For example, even though the first torque electric drive motor 120 may not be powered to provide torque to the socket drive 104, the first torque electric drive motor 120 (e.g., the first torque drive member 128) will rotate with the second torque electric drive motor 140 (e.g., the second torque drive member 148) for the second torque electric drive motor 140 to provide torque to the socket drive 104. In such an embodiment, the first torque electric drive motor 120 will not apply an electrical load (e.g., a counter-torque) against the second torque electric drive motor 140. Thus, other than frictional loads or forces, the first torque electric drive motor 120 will freely spin with the second torque electric drive motor 140 for torque from the second torque electric drive motor 140 to be provided to the socket drive 104.

A torque tool in accordance with the present disclosure may be able to provide, control, and/or measure torque over a wider range. For example, by including multiple electric motors, a wider range of torque may be able to be provided through a torque tool in accordance with the present disclosure. Further, torque may be more easily controlled or measured using multiple electric motors in accordance with the present disclosure. Torque provided by the torque tool may be measured based upon electric power or current provided to or consumed by each motor of the torque tool, which may be more accurate at lower and/or higher torque ranges, and may eliminate drift in sensors or gauges used with other torque tools. Additionally, the electric power or current provided to the motors can be measured individually or together for more accurate and reliable measurements. For example, torque provided by the torque tool may be measured within about 1% accuracy, which for the example low torque range may be +/− about 4.5 N•m from about 0 N•m to about 450 N•m, for the example high torque range may be +/− about 27 N•m from about 450 N•m to about 2725 N•m, and for the example combined third torque range may be +/− about 32 N•m from about 2725 N•m to about 3195 N•m.

While the foregoing is directed to embodiments of the present disclosure, other and further embodiments of the present disclosure thus may be devised without departing from the basic scope thereof, and the scope thereof is determined by the claims that follow.

The invention claimed is:

1. A torque tool for use subsea with a remotely operated vehicle (ROV), comprising:
   a tool housing;
   a socket drive rotatable within the tool housing; and
   a drive mechanism configured to provide torque to rotate the socket drive within the tool housing, the drive mechanism comprising:
      a first torque electric drive motor configured to provide a first torque to the socket drive, the first torque electric drive motor comprising:
         a shaft; and
         a key positioned at an end of the shaft; and
      a second torque electric drive motor configured to provide a second torque to the socket drive different from the first torque, the second torque electric drive motor comprising:
         a plate, the plate comprising a groove having the key received in the groove, wherein the key positioned at the end of the shaft is coupled to the plate to provide the first torque to the socket drive through the shaft and the plate.

2. The tool of claim 1, wherein the first torque is higher than the second torque.

3. The tool of claim 1, wherein the first torque electric drive motor and the second torque electric drive motor are configured to together provide a third torque to the socket drive that is higher than the first torque and the second torque.

4. The tool of claim 1, wherein, when torque is not provided by the first torque electric drive motor, the first torque electric drive motor is configured to rotate with the second torque electric drive motor to allow the second torque electric drive motor to provide the second torque to the socket drive without the first torque electric drive motor applying an electrical load against the second torque electric drive motor.

5. The tool of claim 1, wherein the plate is coupled to a drive extension to provide the second torque to the socket drive through the plate and the drive extension.

6. The tool of claim 5, wherein the plate comprises a key that is received in a groove of the drive extension to provide the second torque to the socket drive through the plate and the drive extension.

7. The tool of claim 6, wherein:
   the first torque electric drive motor comprises a first stator and a first rotor configured to provide the first torque to a first torque drive member, the first torque drive member comprising the shaft and the key;
   the first torque drive member is disposed at least partially within the first rotor;
   the first torque drive member further comprises one or more plates coupled to the shaft and the first rotor;
   the second torque electric drive motor comprise a second stator and a second rotor configured to provide the second torque to a second torque drive member, the second torque drive member comprising the plate; and the second torque drive member is disposed at least partially within the second rotor.

8. The tool of claim 1, further comprising an electronics section configured to receive electric power and provide the electric power to the first torque electric drive motor and the second torque electric drive motor.

9. The tool of claim 8, wherein the electric power is provided from the electronics section to the second torque electric drive motor through the first torque electric drive motor.

10. The tool of claim 9, further comprising an electric conduit extending from a controller of the electronics section and to the second torque electric drive motor through the first torque electric drive motor, wherein the electric power is provided through the electric conduit.

11. The tool of claim 8, wherein the electronics section is configured to receive control signals to control the first torque electric drive motor and the second torque electric drive motor.

12. The tool of claim 1, further comprising a gearbox and a drive shaft coupled between the drive mechanism and the socket drive and configured to provide torque from the drive mechanism to the socket drive.

13. The tool of claim 1, further comprising one or more latches movable between an engaged position to engage a subsea component and a disengaged position to disengage the subsea component.

14. The tool of claim 1, further comprising:
a handle coupled to the tool housing and configured for the ROV to control the torque tool through the handle; and
a nose cone coupled to the tool housing with the socket drive configured to rotate with respect to the nose cone;
wherein the socket drive comprises a plurality of sockets movable with respect to each other.

15. A torque tool configured to apply torque to a subsea component with a remotely operated vehicle (ROV), comprising:
a tool housing;
a socket drive rotatable within the tool housing;
one or more latches movable between an engaged position to engage the subsea component and a disengaged position to disengage the subsea component; and
a drive mechanism configured to provide torque to rotate the socket drive within the tool housing, the drive mechanism comprising:
a first torque electric drive motor configured to provide a first torque to the socket drive, the first torque electric drive motor comprising:
a shaft; and
a key positioned at an end of the shaft; and
a second torque electric drive motor configured to provide a second torque to the socket drive different from the first torque, the second torque electric drive motor comprising:
a plate, the plate comprising a groove having the key received in the groove, wherein the key positioned at the end of the shaft is coupled to the plate to provide the first torque to the socket drive through the shaft and the plate,
wherein the first torque electric drive motor and the second torque electric drive motor are configured to together provide a third torque to the socket drive that is higher than the first torque and the second torque.

16. The tool of claim 15, wherein:
a first torque drive member of the first torque electric drive motor and a second torque drive member of the second torque electric drive motor are coupled to each other with the first torque electric drive motor configured to provide the first torque to the socket drive through the first torque drive member and the second torque drive member, the first torque drive member comprising the shaft and the key positioned at the end of the shaft, and the second torque drive member comprising the plate comprising the groove;
when torque is not provided by the first torque electric drive motor, the first torque electric drive motor is configured to rotate with the second torque electric drive motor to allow the second torque electric drive motor to provide the second torque to the socket drive without the first torque electric drive motor applying an electrical load against the second torque electric drive motor; and
when torque is not provided by the second torque electric drive motor, the second torque electric drive motor is configured to rotate with the first torque electric drive motor to allow the first torque electric drive motor to provide the first torque to the socket drive without the second torque electric drive motor applying an electrical load against the first torque electric drive motor.

17. The tool of claim 16, wherein:
the first torque electric drive motor comprises a first stator and a first rotor configured to provide the first torque to the first torque drive member;
the first torque drive member is disposed at least partially within the first rotor;
the first torque drive member further comprises one or more plates coupled to the shaft and the first rotor;
the second torque electric drive motor comprise a second stator and a second rotor configured to provide the second torque to the second torque drive member; and
the second torque drive member is disposed at least partially within the second rotor.

18. The tool of claim 15, wherein the plate is coupled to a drive extension to provide the second torque to the socket drive through the plate and the drive extension.

19. The tool of claim 18, wherein the drive extension is coupled to a gearbox to provide the first, second, and third torques to the socket drive through the gearbox.

* * * * *